Figure 1:
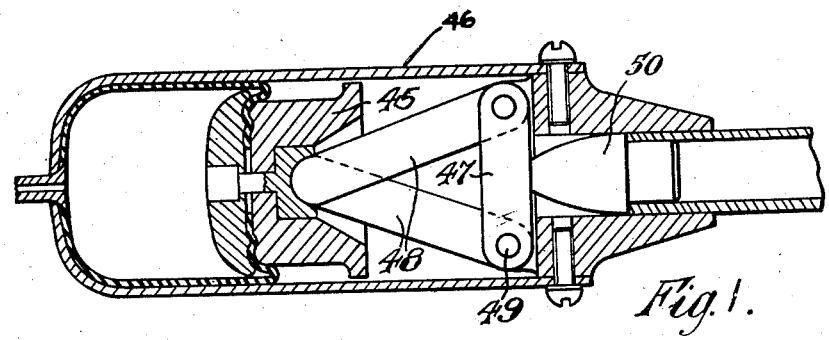

April 8, 1958  H. J. BUTLER  2,829,500
FLUID PRESSURE ACTUATED SYSTEM AND
OPERATING MEANS THEREFOR
Filed Dec. 3, 1954

INVENTOR
Henry James Butler
by Benj. T. Rauber
his attorney

United States Patent Office 2,829,500
Patented Apr. 8, 1958

2,829,500

FLUID PRESSURE ACTUATED SYSTEM AND OPERATING MEANS THEREFOR

Henry James Butler, Sutton Coldfield, England, assignor to Dunlop Rubber Company Limited, London, England, a British company Application December 3, 1954, Serial No. 472,994

5 Claims. (Cl. 60—54.6)

This invention relates to fluid pressure actuated systems and more particularly relates to pneumatic braking systems. The invention also relates to master cylinders for incorporation in such systems, which may also be incorporated in a hydraulic system.

Pneumatic systems have many advantages over hydraulic systems in that they are clean, and do not require hydraulic liquid, with its attendant disadvantages, as the compression medium. A serious disadvantage with pneumatic systems, however, is that, owing to the compression curve of air, the pedal stroke required, in e. g. a conventional master-cylinder and vehicle braking system, to compress the air in the system to a value efficiently to apply the wheel brakes, is excessively large. For this reason pneumatic braking systems for vehicles in current use are normally supplied through a compressor and air bottle, and are fitted only to large commercial vehicles and the like where the extra weight involved is of little account and where the extra cost of the compressor and air bottle is not critical.

My present invention provides a pneumatic system and operating means therefor, and more particularly a pneumatic braking system for vehicles, which does not need a compressor, air bottle and the like and which is light, inexpensive to construct, and efficient in operation. My invention further provides a master-cylinder for incorporation in such a pneumatic system but which is also applicable to a conventional hydraulic system.

According to my invention a master-cylinder comprises a cylinder adapted to contain fluid, a member slidable therein to pressurize said fluid, a foot pedal or the like for actuating said member, means associated with the member and with the foot pedal for progressively decreasing the rate of movement of the member for uniform movement of the foot pedal as the member is actuated and a conduit adapted to connect said master-cylinder with a fluid pressure mechanism to be operated.

The principal application of master cylinders in accordance with the invention is for the actuation of pneumatically operated mechanisms, particularly brake or clutch mechanisms, in which case it is important that the volume of air in the connection from the master cylinder to the mechanism and in the mechanism itself should be as small as possible when the mechanism is idle.

According to the invention also, therefore, a pneumatically operated brake or clutch system comprises a master cylinder having a plunger slidable therein to effect pressurization of the air in the system, a foot pedal or the like for actuating the plunger, means associated with the plunger and with the foot pedal for progressively decreasing the rate of movement of the plunger for uniform movement of the foot pedal as the brake or clutch is operated, pneumatically operated mechanism for actuating the brake or clutch and a conduit connecting the master-cylinder with the pneumatically operated mechanism. Preferably the pneumatically operated mechanism is a piston and cylinder device having retraction means for the piston though it may, for example, be a bag, bellows mechanism or the like.

The brake or clutch operating mechanism, preferably comprises a piston and cylinder mechanism and means are associated therewith to automatically return the piston of said mechanism to the inoperative end of the cylinder and so reduce to a minimum the volume of air in the system when inoperative. For this reason also the pressure line between the master cylinder and operating mechanism is of as narrow a bore as possible, e. g. 1/16" diameter.

Figure 2:
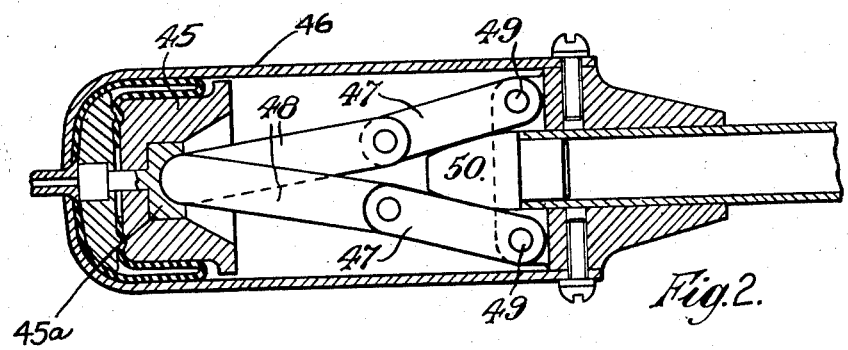

The invention will now be described with reference to the accompanying drawings of which:

Figure 1 is a sectional view of a master-cylinder constructed according to the invention, Figure 2 is a sectional view of the master-cylinder of Figure 1, showing the piston thereof in the operative position.

In the embodiment of the invention shown in the accompanying drawings, a piston 45, slidable longitudinally in a cylinder 46, is driven in its compression stroke by a driving plunger through two linkages each formed of a link 47 and a link 48. One end of the link 47 of each pair is pivotally secured to one of two pivot pins 49, located on opposite sides of the center line of the cylinder and the opposite end is pivotally secured to an end of its associated link 48, the opposite end of which bears on a bearing member 45ª centrally mounted on the piston 45. In the retracted position of the piston 45, the links 47 lie transversely of the cylinder 46 in the path of the plunger 50.

On depressing the foot-pedal the rounded end of the plunger abuts the central portion of each link 47 and, moving it angularly about its fixed point 49, moves the associated links 48 up the cylinders, the ends of said links 48 together moving the master-cylinder piston. By arranging the lengths of the links and also by varying the configuration of the adjacent end of the member 50 the load input output curve may be arranged to follow a predetermined path. The mechanical advantage obtained through the links may increase from a low initial value, at the beginning of the stroke, when the pressure of the air in the cylinder is low, to a high value when the air pressure is at a maximum. In this manner a large volume of air may be compressed by a relatively small pedal movement inasmuch as a large cylinder and a large piston area could be used.

Master-cylinders in accordance with the invention may also be applied to any conventional hydraulic braking system.

Having described my invention—what I claim is:

1. A master cylinder for fluid brakes which comprises a cylinder having an outlet, a member co-axially slidable therein to pressurize fluid in said cylinder, a pair of links pivotally joined at one of their respective ends, the opposite end of one link being connected to said co-axially slidable member and said link extending at an angle to the axis of the cylinder and the other end of the other link being pivoted at a fixed point spaced from an end of said slidable member, said link extending transversely of the axis of said cylinder and at an angle to its associated link and a plunger moving axially of the axis of said cylinder to slidably engage said transverse link and displace it angularly to rotate it towards alignment with its associated link and to move said piston axially into said cylinder.

2. The master cylinder of claim 1 having two pairs of links placed diametrically of said cylinder with their transverse links crossing on the axis of said cylinder.

3. The master cylinder of claim 2 in which said plunger has a frusto-conoidal end engaging said transverse links.

4. The master cylinder of claim 2 in which the transverse links are parallel and engaged at their mid points by said plunger.

5. The master cylinder of claim 4 in which said plunger has a substantially rounded end engaging said transverse links.

References Cited in the file of this patent
UNITED STATES PATENTS

| | | |
|---|---|---|
| 1,430,746 | Loughead | Oct. 3, 1922 |
| 1,951,224 | Von Oberstadt | Mar. 13, 1934 |
| 2,168,719 | Staude | Aug. 8, 1939 |
| 2,175,447 | Rike | Oct. 10, 1939 |
| 2,209,595 | Brock | July 30, 1940 |
| 2,341,318 | Forbes | Feb. 8, 1944 |